United States Patent
Edwards et al.

(10) Patent No.: US 7,021,446 B2
(45) Date of Patent: Apr. 4, 2006

(54) CENTRIFUGAL CLUTCH WITH SHOE RETAINING FEATURE

(75) Inventors: Daniel P. Edwards, Nashville, AR (US); Robert T. Cline, Texarkana, TX (US)

(73) Assignee: Electrolux Home Products, Inc., Cleveland, OH (US)

( * ) Notice: Subject to any disclaimer, the term of this patent is extended or adjusted under 35 U.S.C. 154(b) by 136 days.

(21) Appl. No.: 10/726,884

(22) Filed: Dec. 3, 2003

(65) Prior Publication Data

US 2005/0121285 A1 Jun. 9, 2005

(51) Int. Cl.
*F16D 43/18* (2006.01)

(52) U.S. Cl. .............................. 192/105 BA; 192/109 R
(58) Field of Classification Search .......... 192/105 BA, 192/103 B, 109 R
See application file for complete search history.

(56) References Cited

U.S. PATENT DOCUMENTS

| | | | |
|---|---|---|---|
| 521,160 A * | 6/1894 | Geiger ..................... 192/12 R |
| 1,745,681 A * | 2/1930 | Lowndes ................. 192/105 R |
| 2,027,970 A | 1/1936 | Gillies |
| 2,703,163 A | 3/1955 | Millar |
| 2,753,967 A | 7/1956 | Bowers |
| 3,810,533 A * | 5/1974 | Densow ................. 192/105 BA |
| 4,227,601 A * | 10/1980 | Pilatowicz ............ 192/105 BA |
| 4,294,342 A | 10/1981 | St. John |
| 4,625,849 A | 12/1986 | Gommel |
| 5,437,356 A * | 8/1995 | Lohr ..................... 192/105 BA |
| 5,560,465 A * | 10/1996 | Zindler ................. 192/105 BA |
| 5,921,364 A | 7/1999 | Kobayashi |
| 6,247,570 B1 * | 6/2001 | Zindler ................. 192/105 BA |
| 6,536,574 B1 | 3/2003 | Fehring |

FOREIGN PATENT DOCUMENTS

DE        28 40 364        4/1980

* cited by examiner

*Primary Examiner*—Richard M. Lorence
(74) *Attorney, Agent, or Firm*—Pearne & Gordon LLP

(57) ABSTRACT

A centrifugal clutch for coupling the rotational force of a driving member to a driven member includes a hub that is adapted to be secured at substantially its center to the driving member. The hub has a plurality of arms extending substantially radially from its center. A plurality of clutch shoe means for coupling the driving and driven members are located circumferentially about the center of the hub and are slidably mounted on the arms of the hub for movement independently of one another along the arms inwardly and outwardly of the center of the hub. The clutch includes means for limiting the furthest extent to which the clutch shoe means may move outwardly of the center of the hub along the arms of the hub and means for urging the clutch shoe means inwardly along the arms of the hub toward the center of the hub.

2 Claims, 5 Drawing Sheets

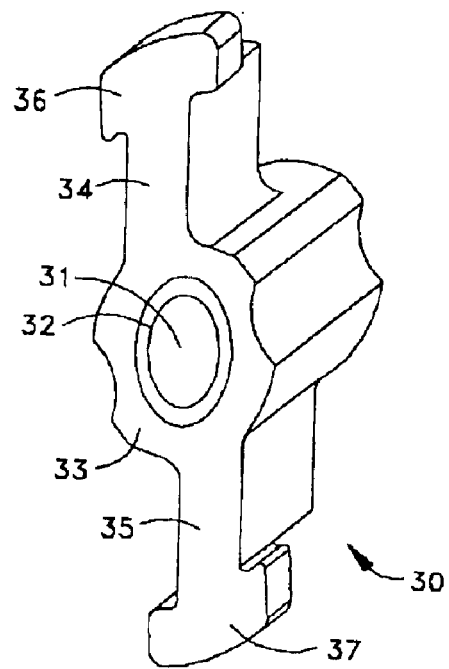
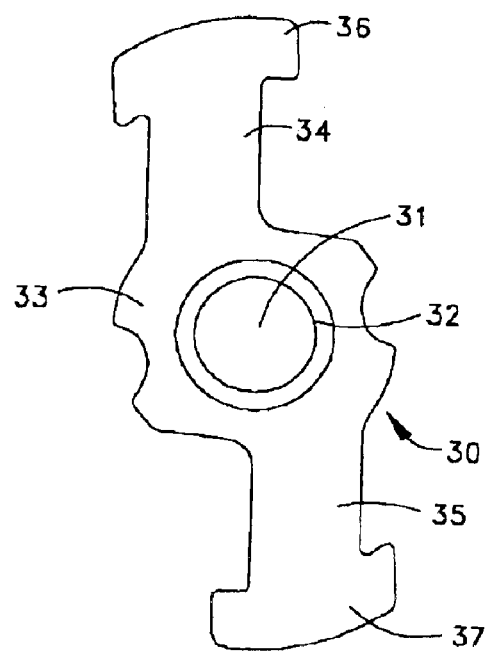
Fig.6    Fig.7
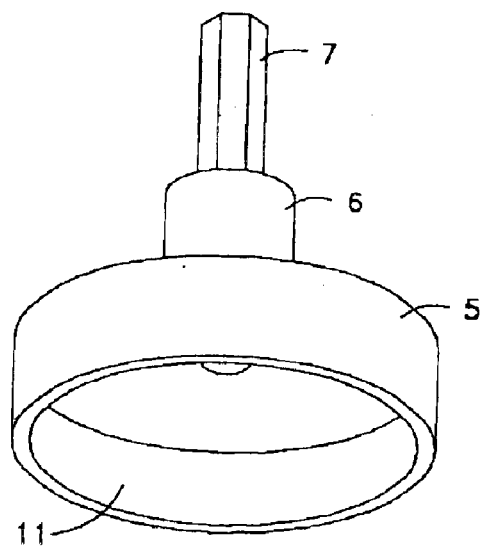
Fig.8

CENTRIFUGAL CLUTCH WITH SHOE RETAINING FEATURE

FIELD OF THE INVENTION

This invention relates to mechanical clutches; more particularly, the invention relates to mechanical, centrifugal clutches.

BACKGROUND OF THE INVENTION

Mechanical, centrifugal clutches are well known. They have found applications in a variety of mechanisms and devices where it is desired to transfer torque, or rotational force, from a driving member to a driven member only after the driving member has reached a desired rotational speed. At the desired rotational speed, centrifugal force applied to frictional elements associated with the driving member cause the frictional elements to move outwardly and engage a complementary surface of the driven member, thereby coupling the driving member to the driven member. As a result, the torque, or rotational force, of the driving member is transferred to the driven member. Clutches of this type are employed, for example, in brush cutters, hedge trimmers and other kinds of equipment for the maintenance of shrubs, trees and lawns.

A particular centrifugal clutch disclosed in the prior art is the subject of U.S. Pat. No. 2,027,970. The frictional elements, or clutch shoes, disclosed in that patent have frictional linings that engage an annular flange of a driven member when the rotational speed of the driving member reaches a desired level, thereby coupling a driving member to the driven member. The clutch of U.S. Pat. No. 2,027,970 includes a feature, typically, not incorporated in prior art clutches. Specifically, the furthest outward extent to which the clutch shoes can move is limited. This provides certain benefits. For example, the outward movement of the clutch shoes can be limited to prevent the frictional linings from wearing all the way through to the shoe surfaces on which the linings are mounted.

Whatever may be its advantages, the clutch disclosed in U.S. Pat. No. 2,027,970 tends to be cumbersome and complex. In particular, the clutch shoes cannot move independently of one another and the clutch requires a driving member somewhat elaborate in its construction. Thus, holes are formed in the sides of the clutch shoes in a: direction that extends, generally, circumferentially of the shoes. Pins are inserted in the adjacent sides of adjoining shoes. As the shoes are caused to move outwardly under the influence of centrifugal force, each shoe must follow the movements of the shoes adjoining it. Lugs, or stops, are incorporated in the driving member at locations such that, as the shoes continue to move outwardly, the pins will encounter respective lugs and further movement of the shoes is barred.

Despite the relatively highly-developed state of the art with respect to mechanical centrifugal clutches, there remains a need for a clutch construction that is simple, compact, of a lower cost to manufacture and of improved strength and wherein the outward extent to which the clutch shoes can move under the influence of centrifugal force is limited. The present invention satisfies that need. In addition, the present invention provides a more unified clutch construction through the conjoining of the various elements that make up the clutch.

SUMMARY OF THE INVENTION

The present invention comprises a centrifugal clutch that has clutch shoe means for coupling a driving member to a driven member wherein the furthest extent to which the clutch shoe means can move outwardly of the rotational axis of the clutch, under the influence of centrifugal force, is limited. The outward movement that is allowed is sufficient to permit the clutch shoe means to tightly engage a complementary surface of the driven member whereby the driving member is coupled to the driven member and the torque, or rotational force, generated by the driving member is transmitted to the driven member. At the same time, however, the opportunity for the clutch shoe means to move outwardly beyond that point is limited.

The foregoing is accomplished, according to the invention, by slidably mounting the clutch shoe means on, substantially, radially extending arms of a hub means that has a rotational axis at its center. The clutch shoe means are free to move along respective arms of the hub means inwardly and outwardly of the rotational axis of the hub means. A restraining means, such as a garter spring, bears upon the clutch shoe means and urges the clutch shoe means inwardly, along respective arms of the hub means, toward the center of the hub means. The hub means, which is adapted to be connected to the driving member, carries the clutch shoe means with it as it rotates. The clutch shoe means, under the influence of the centrifugal force created as the driving member and hub means rotate, will slide along respective arms of the hub means outwardly of the center, or rotational axis, of the hub means against the urging of the restraining means. As the rotational speed of the driving member, the hub means and the clutch shoe means increases, the clutch shoe means will continue to move outwardly along the arms of the hub means until they engage a complementary surface on the driven member and couple the driving member to the driven member. The outward ends of the arms of the hub means include means that limit the maximum outward extent to which respective clutch shoe means mounted on the arms of the hub means can move.

In order to provide a compact clutch, the clutch shoe means and hub means, including the arms of the hub means, are fashioned so as to be of a substantially equal thickness and have complementary physical features that allow the clutch shoe means and hub means to be placed together in close agreement whereby the overall thickness of the clutch is no greater than the thickness of the clutch shoe means or the hub means.

In accordance with one aspect, there is provided a centrifugal clutch for coupling the rotational force of a driving member to a driven member wherein the clutch includes a hub means adapted to be secured at substantially its center to the driving member. The hub means includes a plurality of arms extending substantially radially from the center of the hub means. A plurality of clutch shoe means are located circumferentially about the center of the hub means and are slidably mounted on respective arms of the hub means for movement independently of one another along the arms inwardly and outwardly of the center of the hub means. Means are provided for limiting the furthest extent to which the plurality of clutch shoe means may move outwardly of the center of the hub means along the arms of the hub means. Also provided are means for urging the plurality of clutch shoe means inwardly along the arms of the hub means toward the center of the hub means.

In accordance with another aspect, each of the clutch shoe means has inward and outward sides in relation to the center of the hub means, the outward side being a greater distance from the center of the hub means than the inward side and comprising a surface adapted to engage the driven member and couple the driven member to the driving member. The inward side of the clutch shoe means includes a passageway that extends in a direction toward the outward side of the clutch shoe means and terminates in a recess in the clutch shoe means. A respective arm of the hub means is located in the passageway of the clutch shoe means. The limiting means is fixed to the outer end of the arm of the hub means and is positioned in the recess when the clutch shoe means is not in engagement with the driven member.

In accordance with a further aspect, the limiting means comprises an enlargement of the arm of a size sufficient to prevent the enlargement from passing through the passageway.

In accordance with still another aspect, the recess extends along the entire length of the clutch shoe means between and substantially parallel to the outward and inward sides of the clutch shoe means. The urging means comprises a garter spring that is located circumferentially of the center of the hub means in the recess of each clutch shoe means between the bottom of the recess and the arm enlargement.

In accordance with yet another aspect, the hub means and each of the clutch shoe means are of substantially equal thickness and have complementary physical configurations enabling them to fit together in close agreement whereby the overall thickness of the clutch is no greater than the thickness of either the hub means or the clutch shoe means.

The foregoing and other features and advantages of the present invention will be understood and appreciated by those skilled in the art from the detailed description below with reference to the drawings.

BRIEF DESCRIPTION OF THE DRAWINGS

Referring now to the drawings wherein like elements are numbered the same in the several FIGURES:

FIG. 6 is an isometric view of the hub means of the embodiment of the centrifugal clutch of FIG. 1;

FIG. 7 is a plan view of the hub means of the embodiment of the centrifugal clutch of FIG. 1 from the side facing the driven member; and FIG. 8 is an isometric view of the driven member.

DETAILED DESCRIPTION OF A PREFERRED EMBODIMENT

For various reasons, it is often preferable that the working elements of a power tool not be directly connected to the power source for the working elements. Rather, it is preferred that the working elements be actuated only after a drive shaft connected to the power source has attained a desired rotational speed. Centrifugal clutches accomplish that result. Typically, the clutches include frictional elements, or clutch shoe means, that rotate with the drive shaft. The frictional elements move outwardly under the influence of centrifugal force. The clutch is constructed so that, when the drive shaft attains a desired rotational speed, the frictional elements will have moved outwardly sufficiently to engage a driven member connected to the working elements, thereby coupling the driving member to the driven member and activating the working elements.

Figure 1:
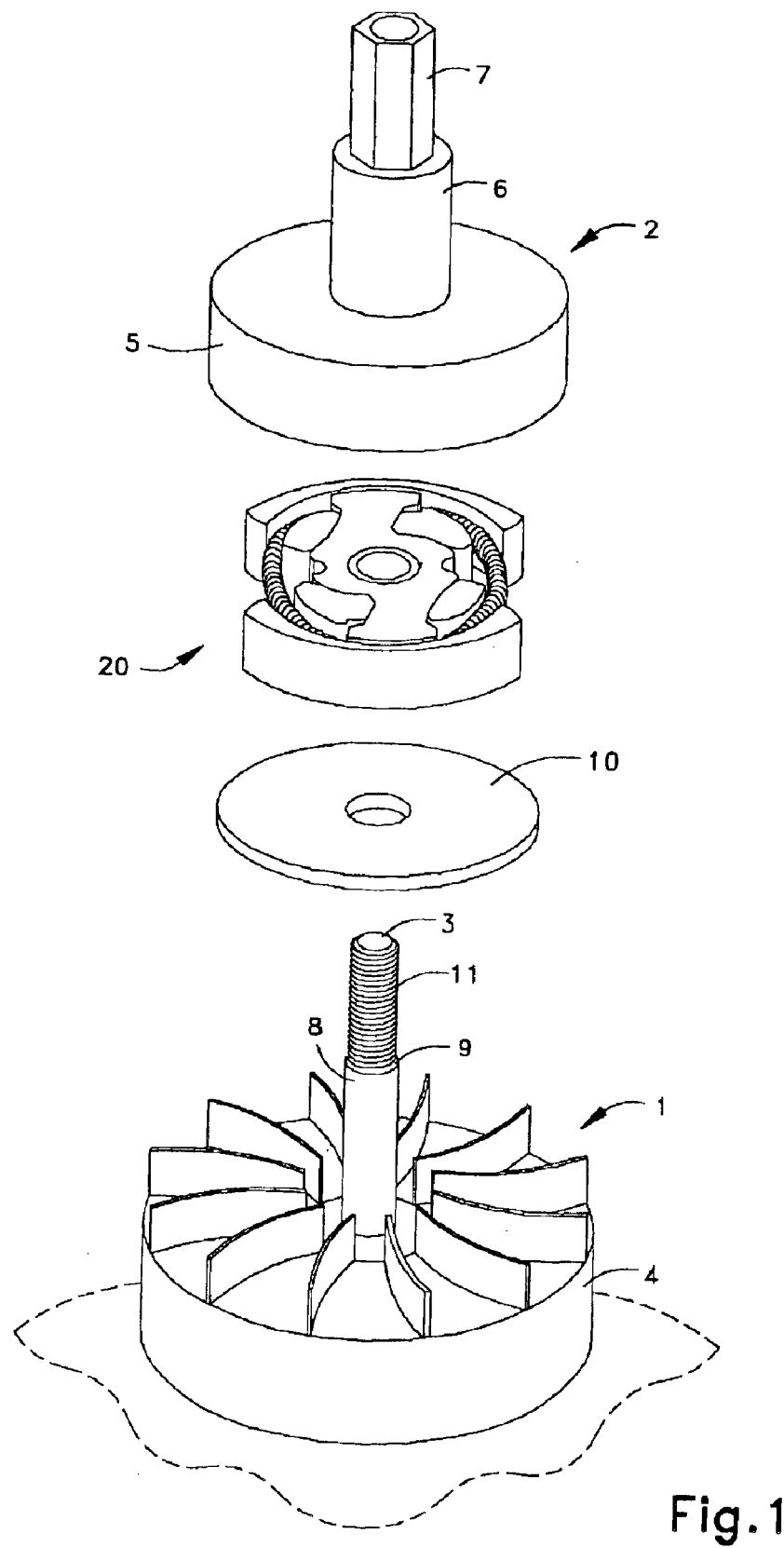
FIG. 1 is an exploded perspective view of an embodiment of the centrifugal clutch of the invention as incorporated into a power train for the purpose of coupling a driving member of the train to a driven member of the train.

FIG. 1 shows a preferred embodiment of a centrifugal clutch of the invention, indicated generally at 20, incorporated into a power train, including a driving member 1 and a driven member 2. The power train is typical of those used in power tools such as brush cutters, hedge trimmers, chain saws and other types of equipment for maintaining trees, shrubs, brush and lawns. However, the invention is not limited to such applications and can be used otherwise, as, for example, with kitchen appliances. Indeed, the invention can be advantageously applied wherever centrifugal clutches are used.

As shown in FIG. 1, the driving member 1 comprises a drive shaft 3 and a power source 4, such as an electric motor or gasoline engine, for example, to which the drive shaft is connected. The driven member 2 includes a flange, or drum, 5 to which is fixed a collar 6. A shaft 7 is attached to collar 6. The shaft 7, in turn, is connected to the working elements of a power tool, such as the cutting blades of a brush cutter, not shown.

A cylindrical sleeve 8 is positioned over drive shaft 3 and provides a shoulder 9 on which a washer 10 rests when in place on the drive shaft. One end of the drive shaft is threaded at 11, and the clutch is attached to the drive shaft at that location. The washer limits the movement of the clutch axially of the drive shaft in the direction of the power source 4.

Drum 5, which has an inside diameter somewhat greater than the diameter of the clutch 20, is positioned over the clutch when the power train is assembled. As will be explained in greater detail below, the inside perimeter 11 of the drum, as best seen in FIG. 8, provides a surface which clutch shoes of the clutch engage for the purpose of coupling the driving member 1 to the driven member 2.

The embodiment of the centrifugal clutch 20 of the invention shown in the figures, basically, consists of three components—a hub means 30; a clutch shoe means, in the form of a pair of clutch shoes 21 and 22; and an urging means, in the form of a garter spring 40. The clutch shoes are, substantially, identical and the same reference number is used to refer to the same feature for each shoe.

Figure 2:
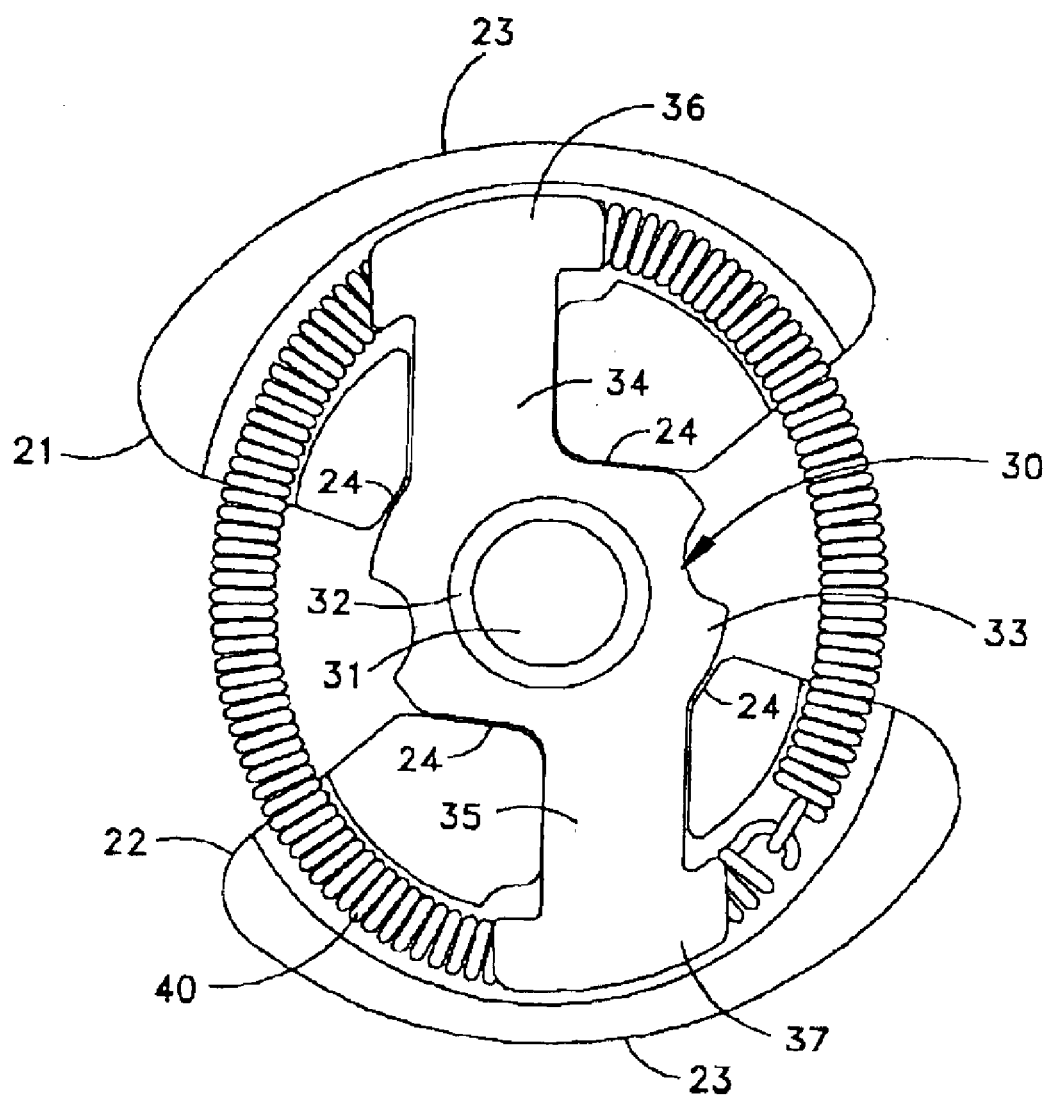
FIG. 2 is a plan view of the embodiment of the centrifugal clutch of FIG. 1 from the side facing the driven member.
Figure 3:
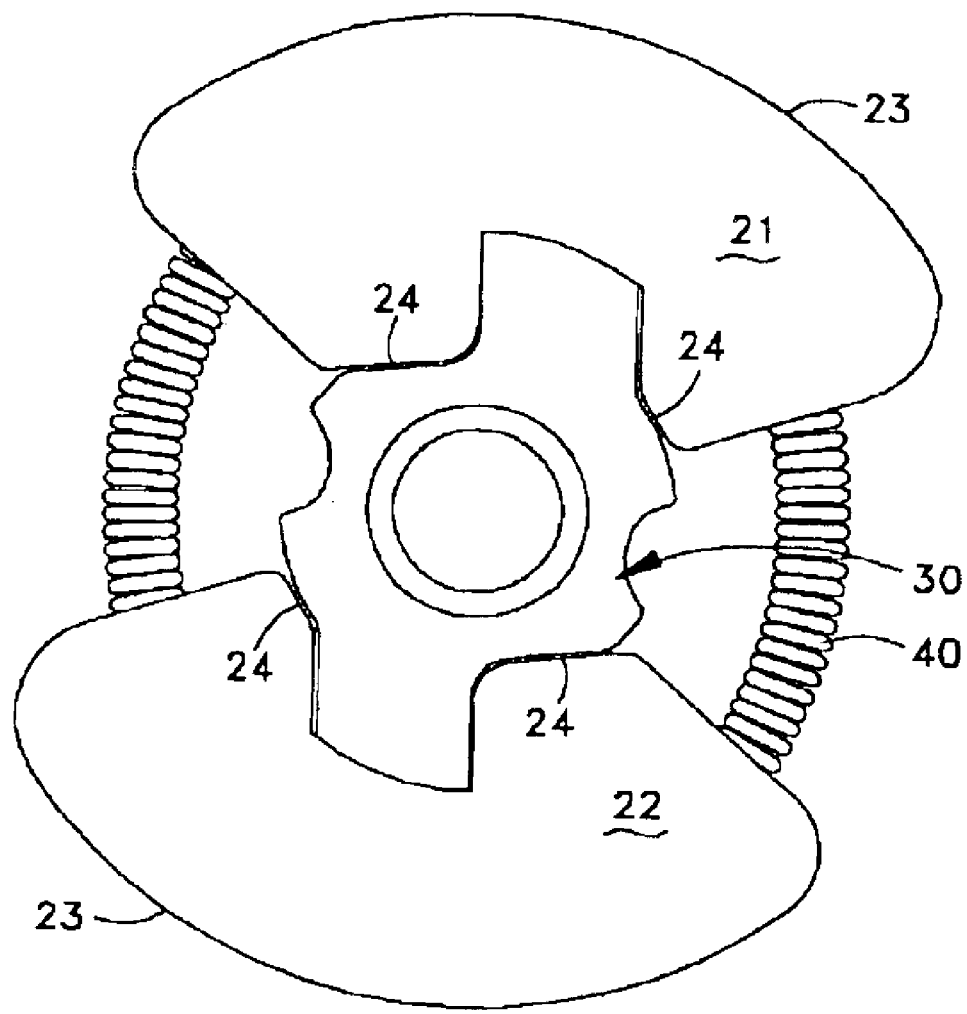
FIG. 3 is a plan view of the embodiment of the centrifugal clutch of FIG. 1 from the side facing the driving member.
Figure 4:
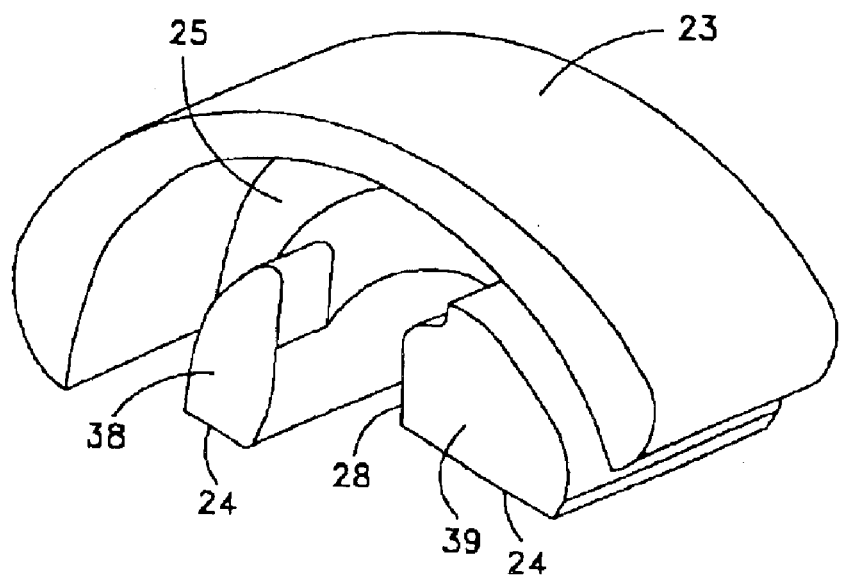
FIG. 4 is an isometric view of the clutch shoe of the embodiment of the centrifugal clutch of FIG. 1.
Figure 5:
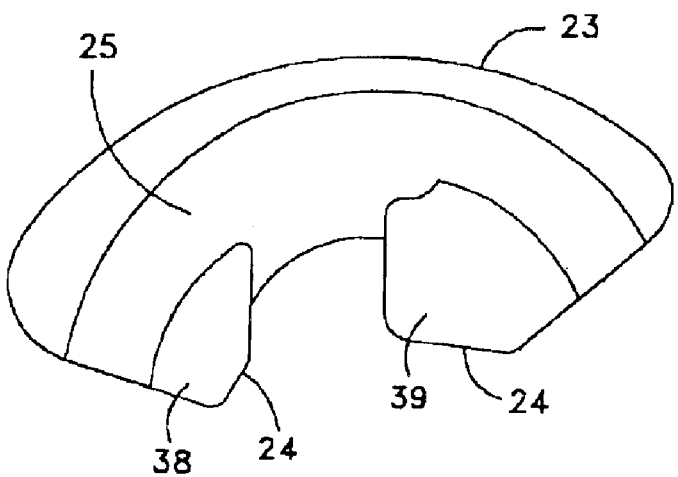
FIG. 5 is a plan view of the clutch shoe of the embodiment of the centrifugal clutch of FIG. 1 from the side facing the driven member.

The hub means 30 has at its center a circular opening 31 that extends through the hub means, and the hub means is threaded within the opening at 32. It is by means of these threads and the threaded end 11 of drive shaft 3 that the hub means is secured to the drive shaft. When secured to the drive shaft, the face of the clutch means, as illustrated in FIG. 3, faces the driving member and the face of the clutch means, as illustrated in FIG. 2, faces the driven member. For reasons that will be obvious from the discussion below, the drive shaft is threaded at 11 in the same direction, either clockwise or counterclockwise, as the direction of rotation of the drive shaft. The hub means is not required to be secured to the drive shaft by means of a threaded connection and these two components may be joined together in other ways known to those skilled in the art.

The hub means 30 includes a base 33 that circumferentially surrounds the opening 31 and from which the two arms 34 and 35 extend in directions substantially radially of the opening 31. The arms include enlargements 36 and 37 at their respective outward ends.

Slidably mounted on the arms 34 and 35 are the clutch shoes 21 and 22, respectively. Each clutch shoe has a, generally, arcuate configuration and includes an outward side 23 and an inward side 24, in relation to the center of the hub means, when mounted on a respective arm of the hub means. The outward side 23 of each clutch shoe comprises the surface that engages the surface 11 of the driven member 2 for the purpose of coupling the driving member to the driven member and, consequently, the curvature of the outward side is, essentially, the same as that of surface 11. If desired, the outward side 23 of each shoe can be provided with friction linings so as to avoid metal-to-metal contact between the shoes and the flange of the driven member. A recess 25 is provided in each clutch shoe and extends along the entire length of the clutch shoe between, and substantially parallel to, the inward and outward sides 24 and 23, respectively, of the clutch shoe.

A passageway 28 is provided in the inward side 24 of each clutch shoe into recess 25. It is through this passageway that the clutch shoe is slidably mounted to a respective arm of the hub means. As is best shown in FIG. 2, the enlargements 36 and 37 of the arms 34 and 35, respectively, are located within the recesses of respective clutch shoes. The passageway through the inward side 24 of each clutch shoe together with the recess 25 establishes the abutments 38 and 39 and, as will be understood, the abutments engage an enlargement of a respective arm of the hub means when the shoe slides outwardly of the center of the hub means along the arm and prevent the shoe from moving outwardly beyond that point of engagement.

An urging means in the form of a garter spring 40 is located within the recesses of the clutch shoes circumferentially of the center of the hub means. The spring acts to urge the clutch shoes inward of the center of the hub means so as to cause the abutments 38 and 39 to engage the base 33 of the hub means. In that case, the spring rests, essentially entirely, under the arm enlargements 36 and 37.

Based on the foregoing description, it will be understood that, in operation, the clutch shoes, initially, are maintained out of contact with the flange 5 of the driven member 2 by the urging of the garter spring 40. However, when the driving member 1 is activated, and as the rotational speed of the driving member is increased, the clutch shoes will move outwardly of the center of the hub means, along respective arms of the hub means, under the influence of the centrifugal force generated by the rotation of the drive shaft, until the outward sides 23 of the clutch shoes come into tight engagement with the surface 11 of the flange 5. At that point, the driving member and the driven member will be coupled together and the rotational force of the driving member will be transferred to the driven member. When the driving member is deactivated, the garter spring will cause the clutch shoes to disengage from the surface 11 of the flange 5, decoupling the driving and driven members and causing the clutch shoes to move inwardly toward the center of the hub means along the arms of the hub means on which they are mounted.

As shown in the embodiment of the invention that has been described and is illustrated in the figures, the thickness of the hub means and the clutch shoes are substantially equal. Additionally, the construction of each of the hub means and the clutch shoes is such as to provide them with complementary physical configurations enabling them to fit together in close agreement whereby the overall thickness of the clutch is no greater than the thickness of either the hub means or the clutch shoes.

For the clutch to operate effectively, it is necessary to provide sufficient freedom for radial movement of the clutch shoes such that the abutments 38 and 39 of the clutch shoes will not engage the arm enlargements 36 and 37 before the outward surface 23 of each of the shoes comes into tight contact with the surface 11 of the flange 5. If it is desired to provide the clutch shoes with friction linings on the outward surfaces 23 of the clutch shoes, the movement of the arms must be limited so that the arm enlargements will engage the abutments before the shoes can move outwardly to a point where the friction lining wears through to the surface 23 after repeated usage. In cases where no friction linings are used, the extent of outward: movement need not be so critically controlled but it will still be the case that the furthest extent to which the clutch shoes can move outwardly is limited, thereby providing for a more unified clutch construction.

The embodiment of the invention illustrated and described is but an example of the invention and the scope of the invention is not limited thereto. Rather, the scope of the invention is defined by the claims set forth below.

We claim:

1. A centrifugal clutch for coupling the rotational force of a driving member to a driven member, the clutch comprising hub means adapted to be secured at substantially its center to the driving member, the hub means including a plurality of arms extending substantially radially from the center of the hub means, a plurality clutch shoe means located circumferentially about the center of the hub means and slidably mounted on the arms of the hub means for movement independently of one another along the arms inwardly and outwardly of the center of the hub means, means for limiting the furthest extent to which the plurality of clutch shoe means may move outwardly of the center of the hub means along the arms of the hub means, and means for urging the plurality of clutch shoe means inwardly along the arms of the hub means toward the center of the hub means, wherein each clutch shoe means has inward and outward sides in relation to the center of the hub means, the outward side being greater distance from the center of the hub means than the inward side and comparing a surface adapted to engage the driven member and couple the driving member to the driven member, a passageway through the inward side of the clutch shoe means and terminating in a recess in the clutch shoe means, an arm of the hub means being located in the passageway of the clutch shoe means, and the limiting means being fixed to the outer end of the arm of the hub means and positioned in the recess when the clutch shoe means is not in engagement with the driven member, wherein the limiting means comprises an enlargement of the arm of a size sufficient to prevent the enlargement from passing through the passageway and wherein the recess in each clutch shoe means extends along the entire length of the clutch shoe means between and substantially parallel to the outward and inward sides of the clutch shoe means, and the urging means comprises a garter spring that is located circumferentially of the center of the hub means in the recess of each clutch shoe means between the bottom of the recess and the arm enlargement.

2. The centrifugal clutch of claim 1 wherein the hub means and each of the clutch shoe means are of a substantially equal thickness and have complementary physical configurations enabling them to fit together in close agreement whereby the overall thickness of the clutch is no greater than the thickness of either the hub or the clutch shoe means.

* * * * *